C. A. JUESCHKE.
HEAT DISTRIBUTER.
APPLICATION FILED MAR. 22, 1915.
1,196,866.
Patented Sept. 5, 1916.
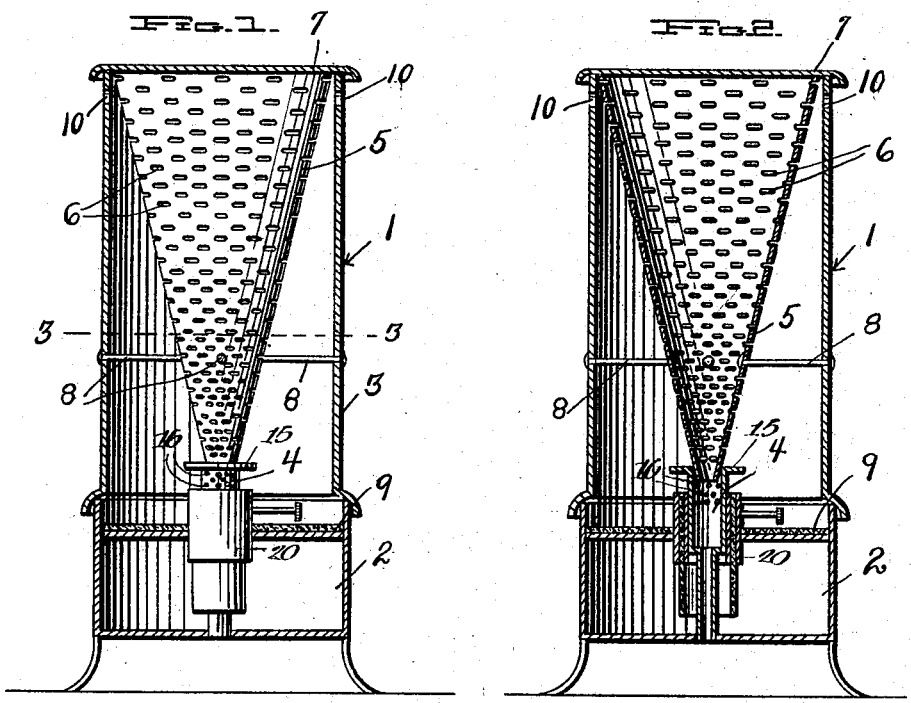
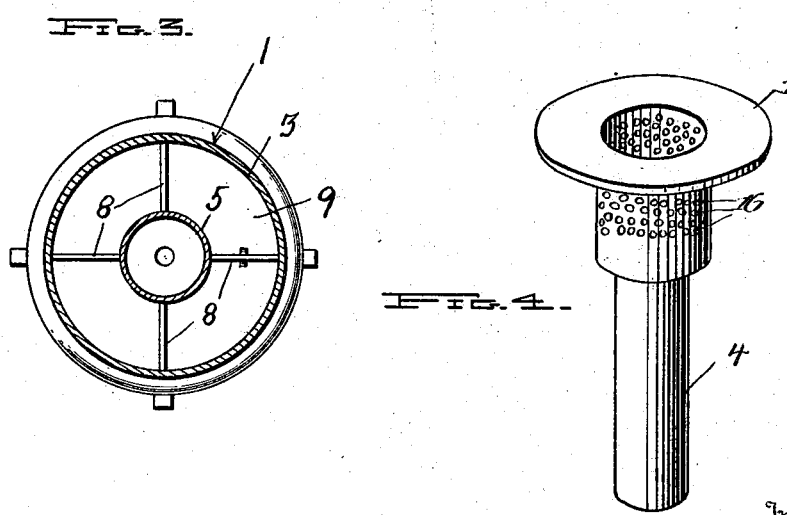
Inventor
C. A. Jueschke

UNITED STATES PATENT OFFICE.

CHARLES A. JUESCHKE, OF PLAINVIEW, TEXAS.

HEAT-DISTRIBUTER.

1,196,866.  Specification of Letters Patent.  Patented Sept. 5, 1916.

Application filed March 22, 1915. Serial No. 16,204.

*To all whom it may concern:*

Be it known that I, CHARLES A. JUESCHKE, a citizen of the United States, residing at Plainview, in the county of Hale, State of Texas, have invented certain new and useful Improvements in Heat-Distributers; and I do hereby declare the following to be a full, clear, and exact description of the invention, such as will enable others skilled in the art to which it appertains to make and use the same.

This invention relates to a heat distributer.

An object of the invention resides in the provision of a device by means of which heat from a heating stove will be thrown outwardly and distributed equally throughout the room.

A further object of the invention resides in so constructing the device that the air will be drawn into the stove from a point adjacent the floor and consequently the cold air in the room will be heated.

With these and other objects in view, such as will appear as the description progresses, my invention comprises the combination and arrangement of parts as set forth in and falling within the scope of the appended claim.

Referring to the drawing: Figure 1 is an elevational view, showing my device in place in a stove, the stove being shown in section. Fig. 2 is a longitudinal sectional view. Fig. 3 is a horizontal section on line 3—3 of Fig. 1, the entire stove being shown, however. Fig. 4 is a perspective view of the air intake.

Referring to the drawing wherein like parts are indicated by like characters throughout the several views:

I have disclosed in the drawing an oil stove 1 having an oil container 2 therein and a casing 3, a conventional form of burner being shown on said container and projecting therefrom in to said casing. In order that cold air may be drawn into the casing 3, I have provided an intake pipe 4 which extends upwardly through the oil container 2 and burner, and is open at its upper and lower ends. The inner end of the pipe 4 projects beyond said burner and is flanged as at 15, the walls of said projecting portions of said pipe being perforated as at 16 to permit of the distribution of air above the burner. Mounted in the casing 3 is a distributing member 5 which is of inverted conical formation, is hollow and is provided with a plurality of rows of holes 6. Secured to the top of this member 5 is a cover 7 which is adapted to rest upon the upper edge of the casing 3 and close the same. This cover is solid so that the heat within the casing 3 will not escape therefrom. The lower end of this distributing member 5 is open and projects into the air intake pipe 4. This member 5 is held in position in the casing 3 by radially extending pins 8 which are secured to the said member 5 and the casing 3.

In order that the heat from the casing 3 may be prevented from raising the temperature of the oil within the container 2 to too great an extent, I have provided an insulating pad 9, made preferably of asbestos and encircling the air intake pipe 4.

In operation after the casing 3 has been swung over onto the container 2 so that the lower end of the member 5 extends into the intake pipe 4, the heat from the burner 20 will raise the temperature of the air in the casing 3 and the distributing member 5 so that the heated air will pass through the holes 10 in the casing 3 and the heat will be radiated from the wall of the casing. The passing of the heated air from the casing 3 will draw the cold air adjacent the floor of the room through the intake pipe 4 and into the distributing member 5 where it will be heated and escape therefrom thereafter through the holes 6 in the said member 5 throughout the entire extent of the member. This air will then escape through the holes 10 in the casing 3 and the heat will be radiated from the wall of the casing.

In the heating stoves ordinarily used the tops or covers are perforated so that the heat escapes therefrom and ascends directly to the ceiling and furthermore the air is drawn into the heating casing through holes located above the oil container. Now in the device constructed in accordance with my invention the distributing member throws the heat outwardly against the side of the casing and inasmuch as the top or cover is solid the heat is radiated from the side of the casing and thrown outwardly a considerable distance before ascending to the ceiling and furthermore inasmuch as the air is drawn into the distributing member from beneath the oil container at a point adjacent the floor it is cold air that is supplied to the distributing member and not air which is partially heated by the casing.

From the foregoing description it will be seen that I have provided a device by means of which heat from a heating stove will be distributed over a large area before the heated air ascends to the ceiling.

While I have illustrated and described a particular embodiment of my invention, I have merely done so for the sake of convenience and I do not wish to be limited to that particular embodiment as it is obvious that numerous changes may be made within the details of construction thereof without in any way departing from the spirit of the invention or exceeding the scope of the appended claim.

What I claim is:—

The combination with a stove having a cylindrical casing and a burner and an oil container at its lower end, of an intake pipe arranged to extend centrally through said container and burner and communicating at its outer and inner ends with the atmosphere and the interior of the casing respectively, a flange projecting outwardly from the inner end of said intake pipe and above said burner, the inner end of said pipe being provided with apertures between said flange and burner, a heat distributer comprising a hollow conical member open at both ends and adapted to have its smaller end inserted in the inner end of said intake pipe, the said larger end of said member being substantially the same diameter as the interior of said casing and being flush with the upper open end thereof, and a cap for closing said upper end, the said casing being provided adjacent its upper end with a plurality of spaced apertures, and the said heating member being provided throughout its entire area with spaced openings.

In testimony whereof, I affix my signature, in the presence of two witnesses.

CHARLES A. JUESCHKE.

Witnesses:
L. R. BAIN,
C. S. WILLIAMS.

Copies of this patent may be obtained for five cents each, by addressing the "Commissioner of Patents, Washington, D. C."